United States Patent [19]

Remund

[11] 3,927,756
[45] Dec. 23, 1975

[54] TRANSFER MECHANISM FOR LONG DRIED FARINACEOUS PRODUCTS

[75] Inventor: Werner Remund, Uzwil, Switzerland

[73] Assignee: Buhler Brothers, Ltd., Uzwil, Switzerland

[22] Filed: Sept. 3, 1974

[21] Appl. No.: 502,362

[30] Foreign Application Priority Data

Sept. 5, 1973  Switzerland.................... 12779/73

[52] U.S. Cl.............. 198/27; 83/926 E; 198/20 R; 198/131
[51] Int. Cl.²........................................ B65G 47/52
[58] Field of Search............ 198/20 R, 27, 131, 133, 198/185; 83/926 E, 83; 271/175; 214/6 R

[56] References Cited
UNITED STATES PATENTS

| | | | |
|---|---|---|---|
| 2,649,055 | 8/1953 | Borrelli | 83/926 E |
| 2,649,056 | 8/1953 | Autenrieth | 83/926 E |
| 2,710,583 | 6/1955 | Fava | 83/926 E |
| 2,813,498 | 11/1957 | Senzani | 83/926 E |
| 2,917,959 | 12/1959 | Senzani | 83/926 E |
| 3,263,543 | 8/1966 | Vassalli | 83/926 E |
| 3,656,603 | 4/1972 | Bontempi et al | 198/20 R |
| 3,680,677 | 8/1972 | Branch et al | 198/20 R |

*Primary Examiner*—Evon C. Blunk
*Assistant Examiner*—Jeffrey V. Nase
*Attorney, Agent, or Firm*—Merchant, Gould, Smith, Edell

[57] ABSTRACT

An improved transport arrangement for the use in making of farinaceous products such as lasagna. The dried elongated product is carried on rods by a rod advancer to a stripping mechanism, where the rods are removed and the product is deposited by a lowering mechanism on a belt conveyor. The improvement comprises a tipping element movable between a raised position where it supports first ends of the product during the stripping operation, and a lowered position in which it is totally out of the path of the product on the lowering mechanism: the tipping element the lowering mechanism are independently powered from the rod advancer drive, and a restraining nose used during the stripping operation is resiliently urged into its restraining position, but may be displaced therefrom by contact with an advancing rod.

12 Claims, 5 Drawing Figures

TRANSFER MECHANISM FOR LONG DRIED FARINACEOUS PRODUCTS

BACKGROUND OF THE INVENTION

The invention refers to a mechanism for transferring long dried farinaceous products whereby the products are moved by rods onto a conveyor belt, and which mechanism has a stripping mechanism equipped with a moving restraining nose, a striking plate and a lowering mechanism and is located beneath the ejection loop of a rod advancer.

The usual practice in the farinaceous products industry is to hang long items such as spaghetti freshly pressed on rods, whereby the spaghetti forms two flanks of approximately equal length which hang down of the two sides of a rod. After the drying process which is carried out continuously, the farinaceous products are hard and brittle, with the result that special mechanisms are used to separate the rod and the farinaceous products. The spaghetti on one rod is laid on one side and abutted against a restraining nose, the rod is removed from between the two flanks and the spaghetti can now be ejected onto a transversely running belt. The arc-shaped ends are cut off and the spaghetti is simultaneously cut to a uniform length. The spaghetti is then ready for packing by amounts.

In a familiar transfer and transport mechanism, the reverse loop of a rod advancer is located above a distribution mechanism. The loaded rod moves on the sloping upper section of the reverse loop toward the distribution mechanism. The ends of the farinaceous products push against a movable nose and are drawn over it. Since the upper section of the reverse loop slopes sharply downward and its ends are kept elevated by the movable restraining nose, the farinaceous products come to rest on one side. When the rod approaches the reversing point of the rod advancer, the farinaceous products fall over the restraining nose onto a lower bearing surface of the restraining nose. The rod continues its motion in the opposite direction in the lower, likewise sloping section of the rod advancer, such that the farinaceous products strike against said restraining nose. The rod exits from the two flanks. In the process, the upper flank of the farinaceous products is pressed upward and, after the rod has completely withdrawn, falls onto the lower flank which is already lying on a lowering mechanism. The restraining nose which is moved by means of a lever pushes the farinaceous products toward a striking plate located on the opposite side, thus aligning all the farinaceous products uniformly.

The procedures just described were regulated by cam disks which now cause the lowering mechanism to descend. The lowering mechanism consists of several support rods fastened to a rotable arm, which rods move downward between individual conveyor belts in such a way that the farinaceous products come to rest transversely on the conveyor belts. A second striking plate once again pushes the farinaceous products against the aforementioned striking plate thus aligning all the products. Subsequently the belt conveys the farinaceous products to a cutting device.

This familiar transfer and transport mechanism has served well for transferring spaghetti, i.e., ejecting it, stripping it and transferring it to a conveyor belt.

For some time now efforts have been made to produce on an industrial basis various forms of farinaceous products which heretofore could be manufactured only in individual lots and hence could be dried only at a correspondingly high cost, since the problems connected with transferring extremely fragile farinaceous products from the rods to a conveyor belt had not been satisfactorily solved.

Such a long farinaceous product in increasing demand is, for example, lasagna, which is a farinaceous product 5–10 cm wide, 15–30 cm long and approximately 1 mm thick.

These products which were originally produced by hand, create great problems because of strong inner tensions. When slightly bumped, dropped, etc., they break and are no longer suitable for sale. Nevertheless, attempts have been made to manufacture lasagna of small format using the short product mold and the belt drier, but the dried product exhibits relatively great warping even when the dimensions are quite small.

Recently a transfer device has become known with the aid of which lasagna can be separated from the rods. For this purpose, the arc ends are held by two holding devices in the manner of pliers while the rod is withdrawn from between the two flanks by the advancer.

Industrial experiments have shown that lasagna can withstand only very slight pressure forces. Provisions must be made to keep the pressure forces from exceeding the level of tolerance, a problem which is easily solved with a simple counterweight, but which is very difficult to solve using remote-controlled operational and holding devices. In the case of the mechanism in question, the fact that, for the reasons indicated, the holding mechanism must be adjusted to each product is certainly a disadvantage. Two actual disadvantages of this solution are: first, that in the holding mechanism the lasagna is turned into the horizontal position against the holding force and second, that the ends of the lasagna fall onto the support table, which can be raised and lowered, via an edge.

The task set for the invention was that of creating a new transfer device which avoids the disadvantages of the known devices and which can be used for various formats such as hollow formats. In addition, if desired, it should also be possible to use the new transfer device for spaghetti etc. and the device should permit high performance with low breakage and waste.

The solution according to the invention is characterized by the fact that the lowering mechanism is coordinated with an initial tipping element, by the fact that the lowering mechanism is equipped with aligning elements, and by the fact that control mechanisms are provided for the individual control of the movement of the tipping element and the lowering device. Thus, the solution according to the invention accomplishes the set task with surprisingly simple means.

By virtue of the fact that the lowering mechanism and the initial tipping element are individually controlled, their combination permits shock-free ejection of the farinaceous products. As a result, the ejection and stripping operation proceeds smoothly with the consequence that no breakage of the farinaceous products results. In particular, it is the fact that the lowering mechanism is designed with aligning units that permits breakage-free transfer of those types of farinaceous products such as lasagna which are the most fragile presently known. If freshly dried lasagna is dropped even over a short distance, a portion of it will break. Mechanical pressing, e.g., against a stop for the purpose of uniform alignment, is not practical in the case of lasagna. An actual pushing mechanism of the kind mentioned in connection with the device initially described above would have to be adjusted in such a way as to prevent the longest lasagna from being pressed against the stop, in which case the pieces of lasagna would probably all be aligned on the straightened side. To assure the removal of all curved pieces, it would still be necessary, as heretofore, to remove a relatively large strip from the side of the sheets, whereby considerable waste results.

In the solution according to the invention, extremely simple means are used to align the pieces of lasagna at their curved ends, particularly in the case of the concept underlying an additional version in which the aligning units are designed as rotatable drums.

By means of the transfer device according to the invention, the pieces of lasagna are nicely aligned by the curved ends with no dropping or shocks and transferred to a conveyor belt by means of rods.

In addition, and particularly in the case of the concept underlying an additional version by virtue of the initial tipping element the combination specified by the invention permits optimal chronological use to be made of the transfer device. Not only does the initial tipping element support the lasagna during the ejection operation. In addition, with appropriate control it can also take over a first phase of the lowering operation, thus making it possible to reduce the unfavorable effects of acceleration at higher transfer speeds. It was probably for this reason that an initial industrial experiment was able to show that movement proceeded with surprising smoothness, which fact, together with the absence of any breakage of the farinaceous products, proves that the problem underlying the invention is perfectly solved. It goes without saying that the proposed transport mechanism is also able to eject other, less problematical shapes of rods onto a conveyor belt.

In an advantageous version, the ejection mechanism has an abutting surface and in raised position the tipping element is located on a straight, imaginary extension of the collection surface. In this way it is possible to draw the farinaceous products from the collection surface onto the tipping element without noticeable transition.

To prevent any uncontrolled movement of the farinaceous products, the tipping element is to be left in a raised position, at least for half the time needed for the stripping operation. At the same time, the lowering mechanism is in lowered position during part of this time. At this time, the tipping element can already begin a slight tipping motion, during which time the rod begins to withdraw from the lasagna while still supporting the lasagna along the straight ends. The other, curved end continues to be supported by the rod itself. When the rod is more than half withdrawn, the lasagna would tip downward at the end of the curve. This can be prevented by raising the lowering mechanism shortly in advance so that it can then begin to support the end of the curve.

In another advantageous version, the tipping element is in a downward tipped position essentially only during the lowering operation of the lowering mechanism. While the lasagna is removed by the conveyor belt via the lowering mechanism, the tipping element is already involved with the following rod.

In addition, it is advantageous to locate the rod advancer in such a way that during the stripping operation the lower flank is resting on the tipping element, i.e., on the lowering mechanism, and that the upper flank is raised only insignificantly.

An additional concept underlying the design consists in the fact that the support surface of the tipping element, like those of the lowering mechanism, is designed as a rotatable drum. In particular, the rotatable drum of the tipping element can also have a soft rubber cover.

The axes of both the lowering mechanism and the tipping element run parallel to rods which support the farinaceous products, such that, relative to the axes, the pieces of lasagna come to rest crosswise on the lowering mechanism or on the tipping element, thus placing the longitudinal dimension of the lasagna in the drop line.

As is known, objects placed on an inclined roller conveyor have a tendency to move on the rollers transversely to the axis of the rollers. Exploitation of this phenomenon led to a surprisingly simple version of the invention. All the pieces of lasagna remain parallel and are aligned with the curves against the stop, and the pieces of lasagna end up exactly perpendicular opposite the conveyor belt, such that the ends of all lasagna pieces are cut off at right angles without the aid of any other devices.

It is advantageous to fasten the movable restraining nose to a rotatable arm which is pressed into its restraining position by a spring and which can be swung out by a rod on the rod advancer. In this way the rod can be withdrawn approximately parallel to the two flanks of farinaceous product, thus facilitating the prevention of breakage in the sheets of farinaceous product. This is advantageous in the case of wide shapes such as lasagna, where a break usually extends far into the straight piece.

BRIEF DESCRIPTION OF THE DRAWING

For an easier understanding of the invention, reference is made to the figures.

DESCRIPTION OF THE PREFERRED EMBODIMENTS

Figure 1:
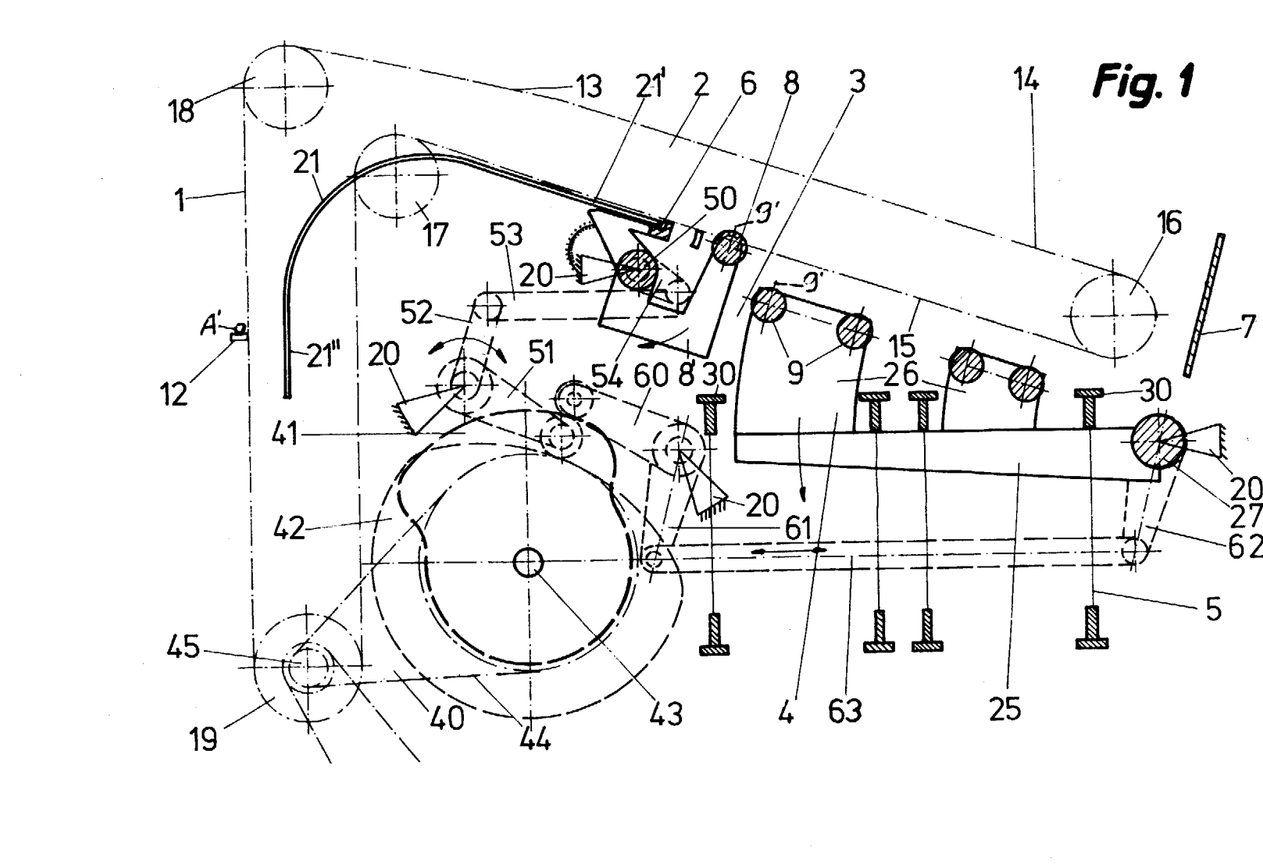
FIG. 1 is a partial schematic view of a version of a fransfer mechanism in cross-section.

As schematically shown in FIG. 1, rods A', which are completely covered with farinaceous products, are transferred to a rod advancer 1 from a resevoir or drier, which is not shown. The rod advancer 1 has an ejection loop 2 which is located above a stripping mechanism 3. The stripping mechanism 3 is equipped with a lowering mechanism 4 which operates in conjunction with a belt conveyor 5. In addition, the stripping mechanism 3 has a movable restraining nose 6 and a stop 7. The lowering mechanism 4 is coordinated with a tipping element 8 and it has a roller 9, of which the axes 9' run parallel to rods A'. The rod advancer 1 is equipped with drags 12 and the ejection loop 2, which is turned toward the right on FIG. 1, tilts downward, whereby a chain 13 forms an upper section 14 and a lower section 15 which run approximately parallel and pass around an end pulley 16. In addition, rod advancer 1 has a idler pulley 17 for the lower section 15, a idler pulley 18 for the upper section 14, and a pulley 19 through which the chain 13 can be stretched and driven in ways not shown.

Figure 2:
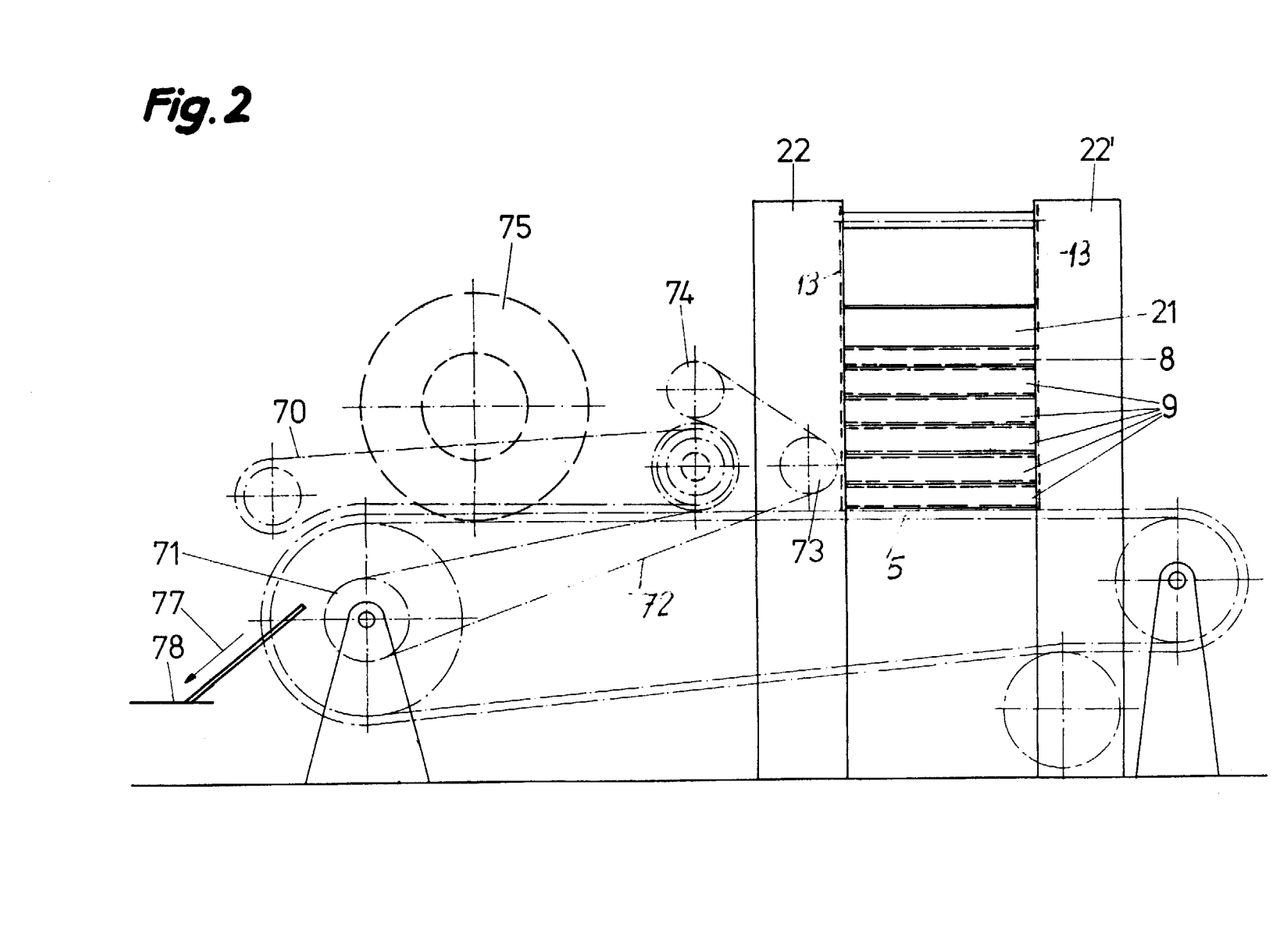
FIG. 2 is a longitudinal view of FIG. 1.

As shown in FIG. 2, the chain 13 is double in side pieces 22 and 22' of stripping mechanism 3, where support points 20 (shown schematically) are provided for lowering mechanism 4, for tipping element 8, for restraining nose 6 and for stop 7.

The stripping mechanism also has an abutting surface 21 with two straight ends 21' and 21'' and, like lowering mechanism 4, stop 7, restraining nose 6 and tipping element 8, it occupies the entire width between the two end pieces 22 and 22'.

The lowering mechanism 4 consists of a control arm 25 and rollers 9 which are held by connecting pieces of sheet metal 26, and is supported by a shaft 27 at a support point 20.

The belt conveyor has several belts 30 which, on the one hand, are located above control arm 25 and, on the other hand, are located at intervals from one another in such a way that rollers 9 can be raised and lowered between them. Tipping element 8 and lowering mechanism 4 are also coordinated by control means 40 which are adjusted to the speed of chains 13 of rod advancer 1.

It is therefore advantageous if chains 13 and control means 40 are powered in the same way (not shown).

Control means 40 are provided with an initial cam disk 41 associated with lowering mechanism 4, and with a second cam disk 42 which is associated with tipping element 8. Cam disks 41 and 42 are firmly mounted on a common shaft 43 which is driven by a wheel 45 via belt 44.

Tipping element 8 can be tipped downward about a pivot 50. The motion is initiated by cam disk 42 and is transmitted via a pulley arm 51 which rests in a support point 20 and is firmly connected with a transmission arm 52. The transmission arm 52 is articulated with a drawing lever 53 which in turn translates the motion to a stub 54, which is firmly connected with tipping element 8, i.e., it thereby translates the motion to the tipping element 8. The transmission of motion from cam disk 42 to tipping element 8 proceeds in a familiar way, in that pulley arm 51 is pressed against cam disk 42 and is changed in its position by the turning of the cam disk, thus producing the raising and lowering of tipping element 8.

Lowering mechanism 4 is moved in an analogous fashion. A pulley lever 60 works together with cam disk 41 and has a flank 61 which is firmly connected with pulley lever 60. Pulley lever 60 and flank 61 rest on a support point 20. An additional flank 62 is firmly connected with control arm 25. The two flanks 61 and 62 are linked together by means of a drawing rod 63. Pulley lever 60 adjusts to the shape of cam disk 41 with the result that the lowering mechanism carries out a motion which is coordinated with chain 13 and with the tipping element.

It is advantageous to build transfer mechanisms together with a cutting device as a unit (FIG. 2), as is the case with the familiar versions.

For this purpose, belt conveyor 5 is coordinated with a holding belt 70 which, in part, runs parallel to conveyor belt 5. As shown in FIG. 2, holding belt 70, which is guided via a wheel 71 and a belt 72, which in turn is guided by two additional pulleys, 73 and 74, is powered directly by the conveyor belt.

A sawing mechanism 75 is located in the middle area of holding belt 70. Immediately following sawing mechanism 75, the sawed-off ends, in particular the curves of the farinaceous products, fall directly downward and are conveyed off separately. The farinaceous products, which have been given uniform dimensions, slide slightly downward on an inclined surface 78 as indicated by arrow 77 and, at least in the case of such very delicate products as lasagna, are hand-packed. At this point too the pieces of lasagna must be prevented from piling up and jolting each other.

Figure 3:
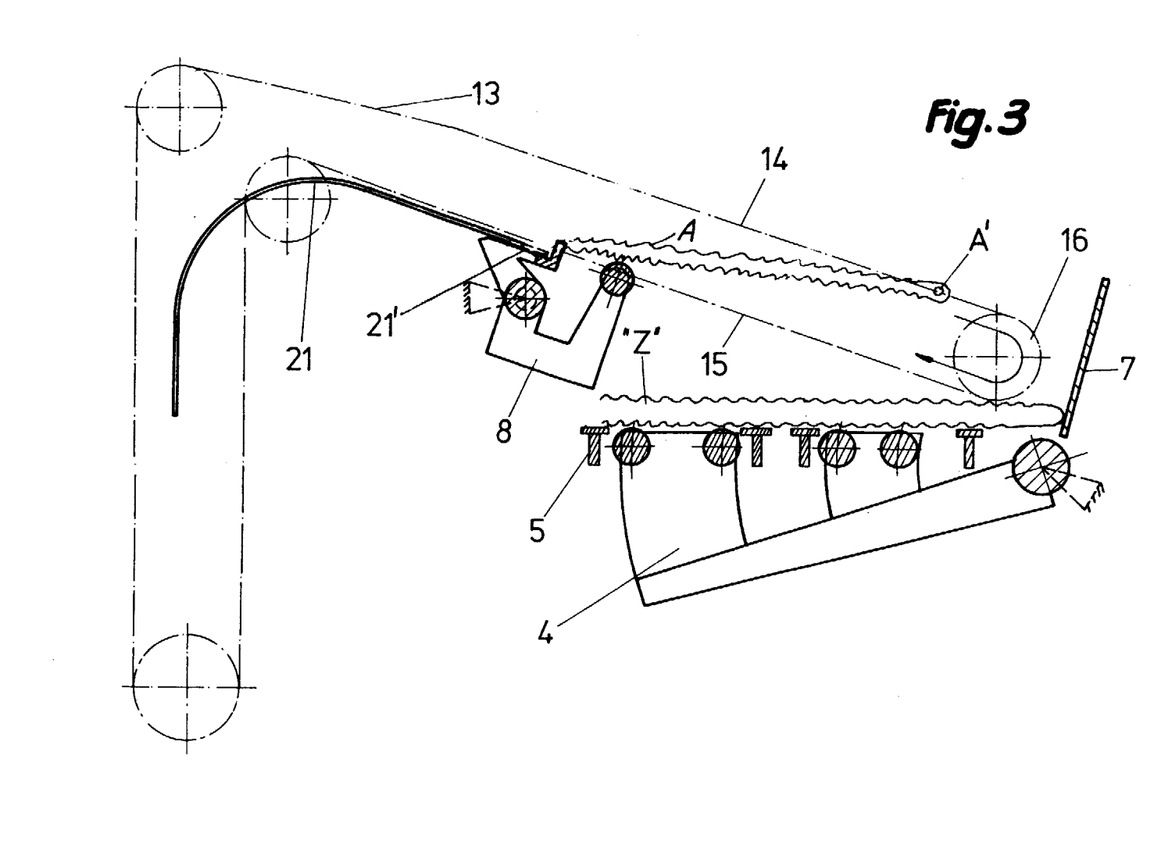
FIG. 3 is a schematic view of the ejection operation performed by the version shown in FIG. 1.
Figure 4:
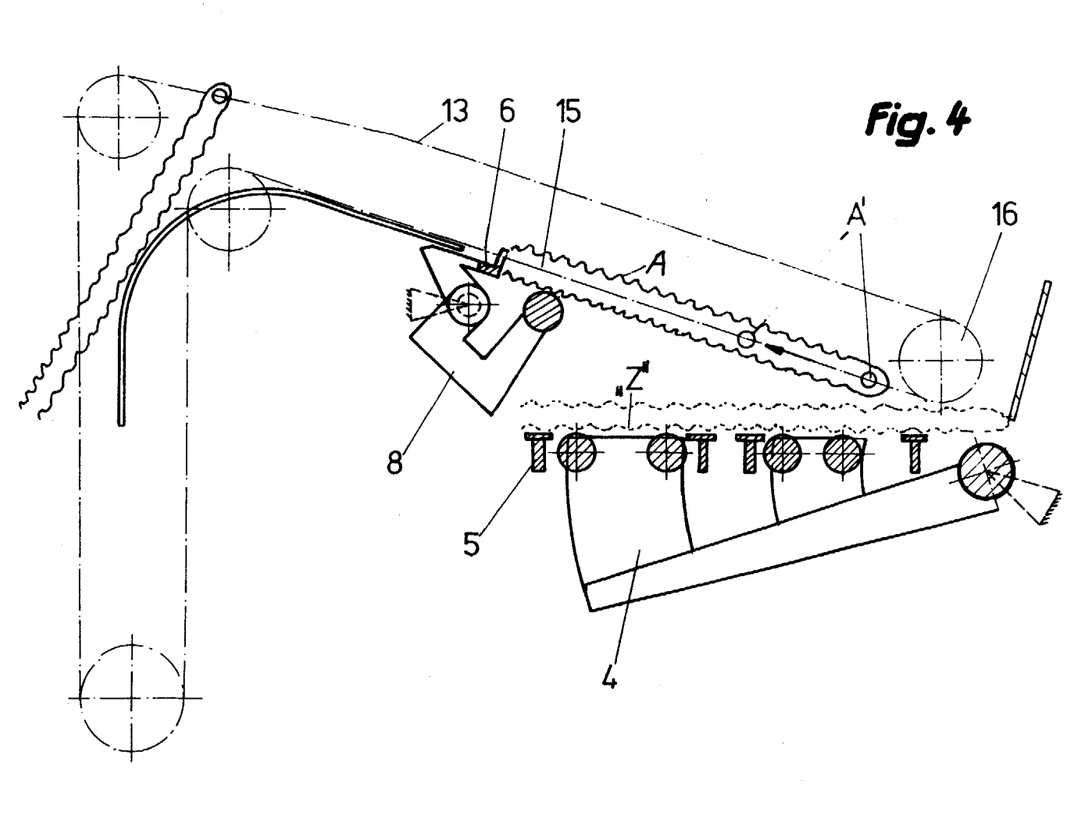
FIG. 4 is a schematic view of the stripping operation.
Figure 5:
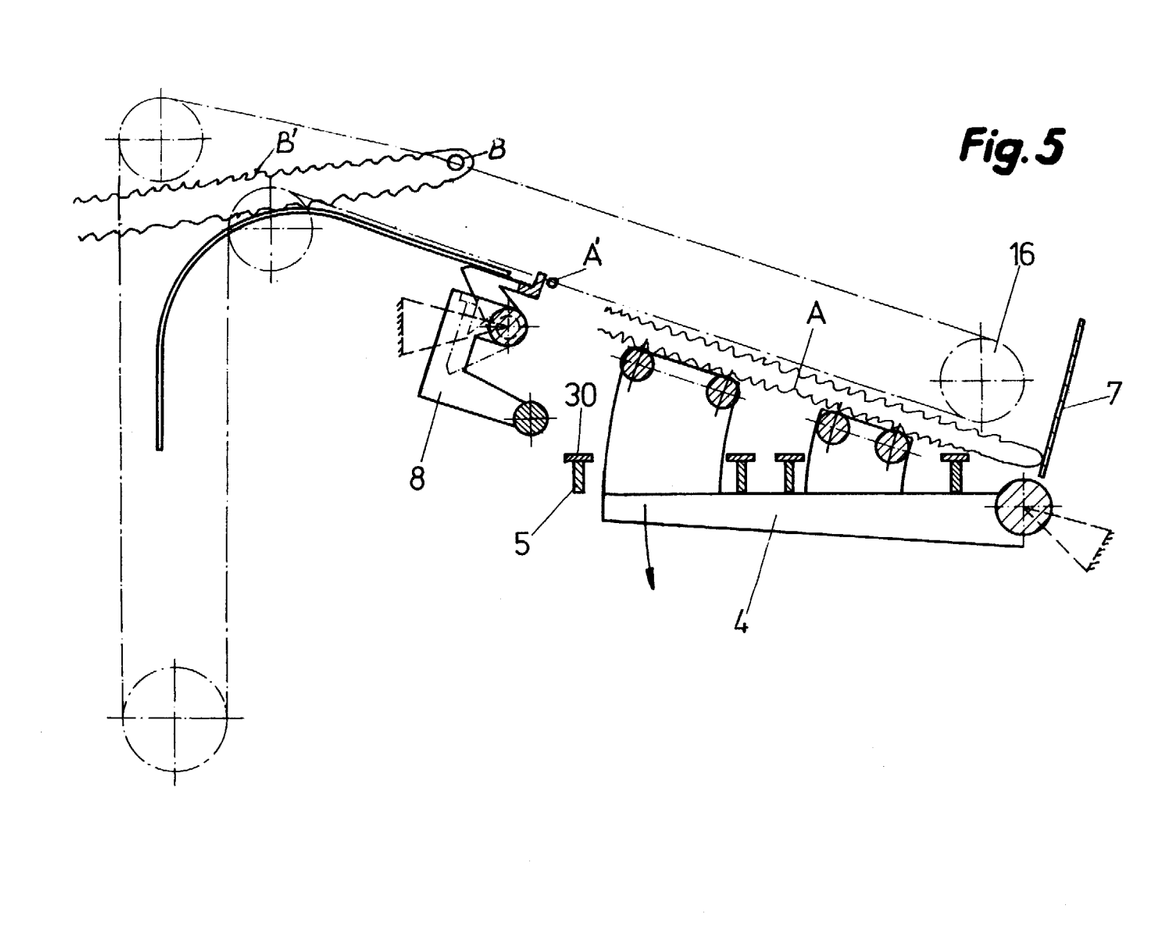
FIG. 5 is a schematic view of the beginning of the lowering operation.

For an easier understanding of the version shown in FIGS. 1 and 2, three different phases of its operation are shown in FIGS. 3, 4, and 5.

In FIG. 3, a rod A' has already been drawn so far to the right that the lasagna A is in an almost horizontal position. The lasagna A is now about to leave the straight end 21' of abutting surface 21. Tipping element 8 is in its highest position, so that the lasagna A is briefly supported by abutting surface 21 and by tipping element 8, on the one side, and by rod A' on the other side. Rod A' moves clockwise on the upper section 14 of chain 13 around end pulley 16 and is passed on to the lower section 15.

The rods in the rod advancer 1 have a length in the magnitude of 1 – 2m, with the result that one rod can bear 20–30 pieces of lasagna without difficulty. Since in each instance the entire lot, i.e., 20–30 lasagna pieces are ejected together onto the conveyor belt, the lowering mechanism 4 cannot be raised until all lasagna pieces "Z" of the previously stripped rod have been carried away by conveyor belt 5. For this reason, lowering mechanism 4 is in lowered position during the ejection phase of lasagna A.

FIG. 4 shows the beginning of the stripping phase. Tipping element 8 has dropped slightly and, in the meantime, rod A' has moved around end pulley 16 and is moving to the left along the lower section 15 of chain 13.

Rod A' itself is to some extent held in place by the ends of the now firm lasagna. For this reason the lasagna A is moved against restraining nose 6, while rod A' can withdraw from between the two ends of lasagna A. During this phase, the lasagna A is still supported by tipping element 8 and by rod A'. However, when rod A' has been withdrawn beyond the middle of the lasagna, the curved end of the lasagna would fall downward. Therefore, lowering mechanism 4 must be raised just prior to this time. In FIG. 4 the lasagna Z is shown with a broken line to indicate that the lasagna Z have now been removed by conveyor belt 5.

FIG. 5 shows the aligning and lowering phase.

The lowering mechanism 4 is in a raised position at this point. By contrast, the tipping element 8 has been tipped downward, an operation which was caused by the control means 40 described initially above, in particular by cam disks 41, 42. Thus, in the simplest way, tipping lever 8 has been removed from the area of motion of lowering mechanism 4.

In contrast to FIG. 4, in FIG. 5 the lasagna has been moved downward and to the right. When rod A' leaves the flanks of the lasagna, the lasagna slips downward. Although in most cases the farinaceous products do not move laterally, perpendicular to the plane of the picture, it is nevertheless repeatedly observed in the case of known versions that the outermost farinaceous products end up in a slanting position. It is therefore advisable to equip the lowering mechanism with aligning units. For this purpose, the collection points for the farinaceous products can be provided with grooved surfaces or, if desired, with lateral guides to insure that all the farinaceous products are parallel, thus also insuring a straight cut in the cutting device. The rotatable drum 9 shown in the example and already described has been found to be the simplest solution to date for the problem of providing the device with an alignment unit. Each individual piece of lasagna slides against stop 7 and alignment devices assure that the pieces of lasagna will remain parallel to each other and relative to the plans of the picture (FIG. 1).

In FIG. 5, a lowering mechanism 4 is about to move downward, while at the same time there is no reason for the lasagna to move away from stop 7 or to undergo any other undesired movement. When lowering mechanism 4 is in lowered position, the pieces of lasagna A rest on belt 30 of conveyor belt 5. Belts 30 subsequently guide lasagna A, like previous lasagna Z, to the cutting or sawing device which can now operate with a minimum of waste and, consequently, with a high degree of efficiency.

Thus, the task posed for the invention is accomplished with a surprisingly simple device. Of course, other long farinaceous product formats can also be transferred in the same way using the solution according to the invention.

In an especially advantageous version the tipping element 8 remains in a raised position for at least half the time required for the stripping operation, while lowering mechanism 4 remains in a lowered position for a portion of this time. This makes it possible to construct the transfer mechanism so that it is very compact but still provides high performance. Ejection and stripping requires a certain amount of time, and the sawing or cutting of the farinaceous products also requires a certain time. The tipping element supports the farinaceous products during the ejection operation and for half the time required for the stripping operation and already assumes responsibility for a small part of the lowering operation. At the same time the pieces of lasagna from the rod which has just undergone the transfer operation can be removed at the speed required for subsequent processing, e.g., sawing. Buffered zones are not required for the transferred farinaceous products.

Additional shortening of the transfer time can be gained by having the tipping element 8 in the downward-tipped position essentially only during the lowering operation of lowering mechanism 4. After a short interruption, tipping element 8 is again immediately ready to support the lasagna on the following rod B'.

In another version the ejection loop 2 of the rod advancer is parallel and, at the most, only slightly above the sloping stripping plane which is basically formed by the raised position of the lowering mechanism 4, by an upper position of tipping element 8 and by movable restraining nose 6. During the ejection operation the upper edge of tipping element 8 is initially somewhat higher than that of restraining nose 6. However, at the end of the ejection operation, the tipping element is tipped slightly downward so that the upper edge of tipping element 8 is only slightly higher than the lower edge of restraining nose 6, a position which may be termed the stripping position of tipping element 8. In its raised position, stripping mechanism 4 moves into the same stripping position. Thus, the moment lowering mechanism 4 takes over the supporting function of the tipping lever, a plane, i.e., a stripping plane is formed, which is extremely advantageous because it has a pronounced slope, a fact which was particularly demonstrable in the case of the wide and large formats. Rod A' withdraws parallel from the lasagna, whereby the upper end of the farinaceous products is raised and there is no breakage in the curves of the product since the two flanks of the farinaceous products can remain in a parallel position and since the pieces of lasagna slide on the sloping plane against stop 7.

In order to eliminate any risk of breakage during the ejection operation, abutting surface 21 is developed, at least in part, to be round in shape.

In another very advantageous version, the alignment units are developed as rotatable drums 9 which have axes 9', whereby drums 9 should be very slightly rotatable. Expeditiously, something like 4 drums 9 are located on lowering mechanism 4, whereby drums 9 should be somewhat longer than rods Z, A', B', etc., on which the farinaceous products hang. Although the manner of operation of an inclined roller conveyor is known per se, even experts were surprised during an industrial experiment by the ease with which all the pieces of lasagna were invisibly guided and ended up parallel against stop 7. This was particularly the case with the two outermost pieces of lasagna on each side of lowering mechanism 4. The inclination of the surface of lowering mechanism 4 is determined in such a way that a single piece of lasagna would slide straight downward. Drums 9 can easily propel a larger number of lasagna pieces, with the result that even those types of lasagna that for some reason would not slide downwards by themselves are carried along. It would also be conceivable, for example, to equip drums 9 with an external driving mechanism, but heretofore this has not been deemed necessary. Axes 9' of drums 9 are parallel to the direction of conveyance of conveyor belt 5.

Just as in the case of lowering mechanism 4, so to in the case of tipping element 8, a rotatable drum 9 can provide the support surface. Since during the ejection operation the farinaceous products are guided by the rod, a rotatable drum 9 on tipping element 8 also affords the advantage that it offers the least possible resistance both clockwise and counterclockwise, a fact which is significant at that moment when the farinaceous products strike the stop.

In addition, it is advantageous to provide rotatable drum 9 of tipping element 8 with a soft rubber cover which, for example, may be wrapped on in the form of a strip. This counteracts lateral shifting, particularly on the part of the outermost farinaceous products.

By way of a structural simplification, tipping element 8 is fastened to a tipping lever 8', of which the pivot 50 is located above lowering mechanism 4 in such a way that drum 9 or tipping element 8 can move freely above lowered lowering mechanism 4. In this way it is possible to eliminate unnecessarily long and expensive means of motion, such as pneumatic cylinders.

In another, especially advantageous version, movable restraining nose 6 is fastened to a rotatable arm 70 which is pressed into its restraining position by a spring 71 and can be swung out by a rod on the rod advancer. The rod advancer can be further guided in a straight line out of the area of the lowering mechanism. The restraining nose is pressed into the restraining position by means of a spring. The very slight force with which the pieces of lasagna rest against restraining nose 6 during the stripping operation is not sufficient to move restraining nose 6. For this reason a relatively weak spring 71 will suffice, which is tensed even more when restraining nose 6 is swung out by a rod, whereupon the rod will return restraining nose 6 to the restraining position after rod A', B', etc. has been removed. When the rod exits from the lasagna, restraining nose 6 can be pushed away in the inclined stripping plane so that the farinaceous products will not jam up or be otherwise exposed to breakage during the last stripping phase.

What is claimed is:

1. In transfer apparatus for elongated dried farinaceous products wherein the products are transported on rods in a powered rod advancer having an ejection loop where said products are removed from said rods and deposited on a belt conveyor located beneath the said ejection loop by means including a stripping mechanism, with a restraining nose and a stop plate, and a lowering mechanism, the improvement which comprises:

an initial tipping element in said apparatus arranged for movement between a raised position, in which it supports first ends of said products preparatory to removal of said rods, and a lowered position, in which it is displaced out of the path of movement of said products on said lowering mechanism;

and means for individually controlling the movements of said tipping element and said lowering mechanism.

2. Apparatus according to claim 1 in which said lowering mechanism includes alignment units in the form of rollers having axes of rotation which are aligned with the direction of movement of the belt conveyor.

3. Apparatus according to claim 2 in which the tipping element includes a roller having an axis of rotation aligned with the direction of movement of the belt conveyor.

4. Apparatus according to claim 3 in which said roller of said tipping element has a cover of rubber.

5. Apparatus according to claim 1 in which the stripping mechanism has an abutting surface, and the tipping element in its raised position extends at least as far as an imaginary straight extension of the abutting surface.

6. Apparatus according to claim 5 in which the abutting surface includes a convexly curved portion.

7. Apparatus according to claim 1 in which the tipping element is in its raised position for at least half of the time required for the stripping operation, and is in its lowered position for a portion of said time.

8. Apparatus according to claim 1 in which the tipping element is basically in its lowered position only during the lowering operation of the lowering mechanism.

9. Apparatus according to claim 1 in which the ejection loop of the rod advancer is located parallel to and only slightly above an arbitrary ejection plane for the purpose of insuring that the position of the product is not forcibly changed during the stripping operation.

10. Apparatus according to claim 1 in which the tipping element and the lowering mechanism operate at different rates to accomplish the lowering operation.

11. Apparatus according to claim 1 in which the tipping element is freely movable when the lowering mechanism is lowered.

12. Apparatus according to claim 1 in which the restraining nose is movable and is resiliently urged into a restraining position from which it can be displaced by contact with an advancing rod.

* * * * *